UNITED STATES PATENT OFFICE.

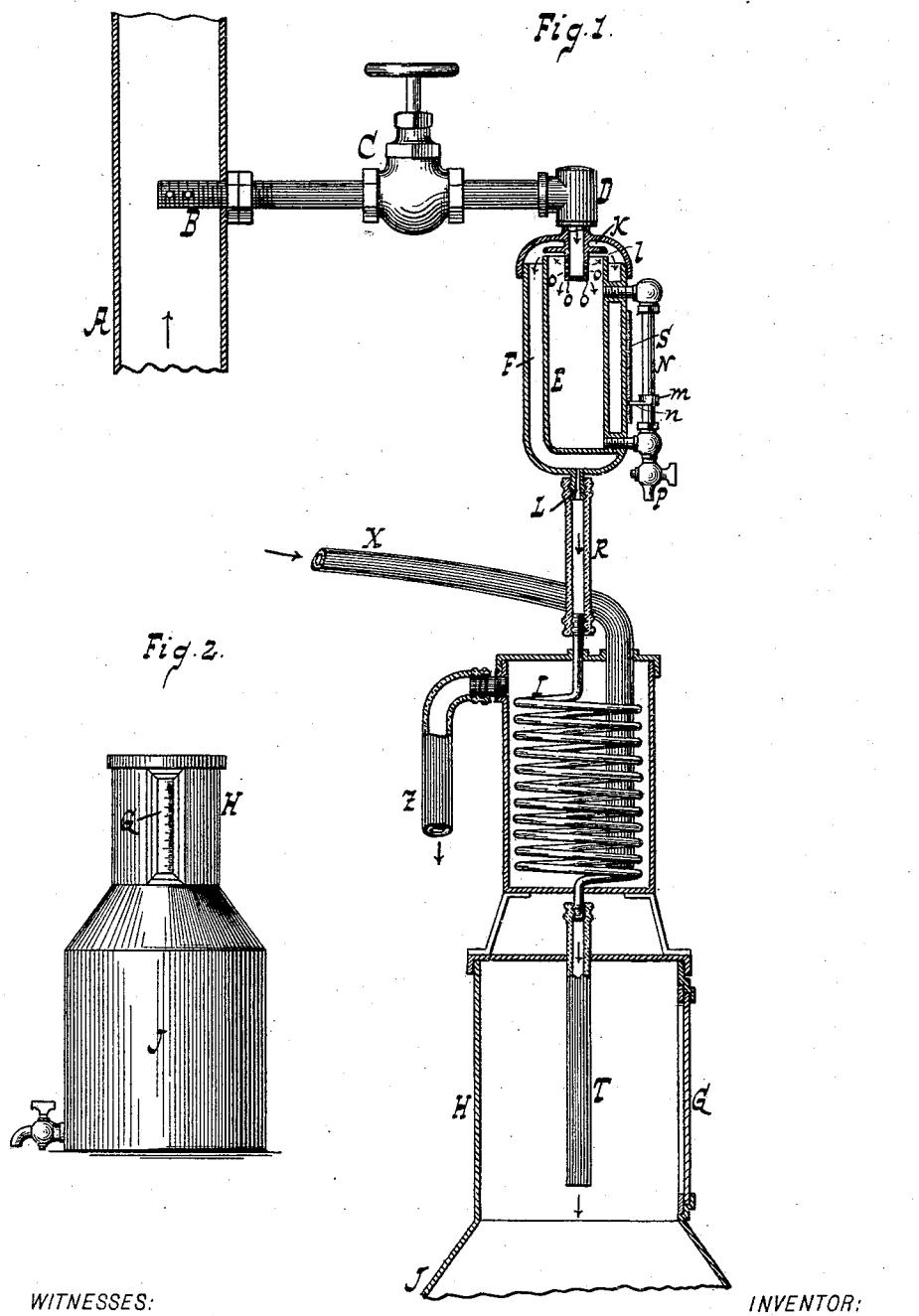

ROLLA CLINTON CARPENTER, OF ITHACA, NEW YORK, ASSIGNOR TO SCHAEFFER & BUDENBERG, OF NEW YORK, N. Y., AND BUCKAUMAGDEBURG, GERMANY.

STEAM-CALORIMETER.

SPECIFICATION forming part of Letters Patent No. 494,057, dated March 21, 1893.

Application filed November 25, 1892. Serial No. 453,079. (No model.)

*To all whom it may concern:*

Be it known that I, ROLLA CLINTON CARPENTER, a citizen of the United States, residing at Ithaca, in the county of Tompkins and State of New York, have invented new and useful Improvements in Steam-Calorimeters, of which the following is a specification.

Heretofore the moisture in steam has been determined by a process which required the complete or partial determination of the amount of heat actually existing in the steam. By comparing this determination with the amount of heat supposed to exist in one pound of steam when in the dry and saturated condition, the amount of moisture present in the steam was determined by calculation. This method requires the use of accurate and costly instruments for measuring pressure and temperature, and with the exception of the throttling instrument, the results at best are but rough approximations. The throttling instrument permits accurate determinations provided the steam is nearly dry or superheated, it requires the use however of accurate and costly instruments for the measurement of temperature and pressure and moreover entirely fails to operate if the steam carries more than two or three per cent of moisture.

The object of my invention is to provide a process by means of which the entire amount of water contained in the steam is removed, and its relative quantity determined directly, without the use of costly instruments for determining the quality and temperature. And to this end my invention consists of an apparatus or receptacle which receives the sample of steam to be tested, extracts the water from it by utilizing the centrifugal force developed when the steam moves around an abrupt bend, retains the water so extracted, and permits the dry steam to pass on. The dry steam is condensed and weighed, or its weight is determined by the time of flow through an orifice of known area, the water thrown down is drawn off and weighed. The percentage or relative weight is then readily determined.

To carry my invention into effect I make use of the apparatus or separating calorimeter shown in the accompanying drawings in which Figure 1 is a sectional front elevation of the calorimeter. Fig. 2 is a front elevation of a measuring vessel.

In the drawings the letter A indicates the main steam pipe from which the sample of steam is to be taken. The sample of steam is drawn from the main steam pipe A by a nipple B of for example one half inch pipe screwed into the main steam pipe so as to extend nearly across the latter. Steam enters this nipple through its open end and through perforations in the side and passes thence through a valve C. The steam then passes through the joint or bend D into the tube K having its bottom closed and having lateral openings $o$ so that the steam is forced to escape from the tube K at a bend or turn or in a circuitous or angular course. The bottom or lower end of the tube K being closed the steam and water cannot enter from tube K into chamber E in a direct downward direction so that any water that may be in the bottom of chamber E will not be agitated or disturbed. As already stated the steam and water escape from the tube K in a lateral or circuitous direction and the water because of its greater gravity will flow or pass down to the bottom of chamber E while the steam will rise in chamber E and escape above through the lateral or annular opening $l$. This annular or ring opening $l$ leads into the vessel or chamber F concentric to chamber E and provided below with an escape or small orifice L. The instrument could be made so as to allow the discharge of the steam to enter directly into the air through a small circular orifice, connected directly to the upper part of the chamber E, and the outer chamber F removed, but in such a case correction would need to be made for water thrown down by radiation. With the construction shown the steam passes from the chamber E into the chamber F and not being reduced in pressure is of an equal temperature in the two chambers, hence any loss by radiation will not condense any steam or add to the water deposited in the chamber E.

The operation then of the instrument is as follows: All the water in the steam is deposited in the chamber E, the dry steam passes into the outmost chamber F, through the opening $l$, and thence passing through the small orifice at L, is discharged. The water from the inner chamber E, can be drawn off by the cock at P, and received in a vessel and weighed, or better a water glass N can be attached as shown and the quantity thrown down in a given time directly measured by means of an attached scale S over which a pointer $n$ can be moved to correspond to various heights as shown by the attached gage glass. The pointer is shown extending from a collar $m$ adapted to slide on glass N. This scale can be graduated to show the weight corresponding to a given volume, in which case the weight of water deposited will be the difference between the two scale readings taken at the beginning and end of the run. The weight of steam discharged at L could be computed by multiplying six sevenths of the absolute pressure by the area of the orifice in square inches by the time expressed in minutes, but I prefer to condense this steam and directly determine its weight or volume. This is done by passing the discharge steam through a coil I of copper pipe as shown in Fig. 1 immersed in a vessel $o$ filled with water. Cold water for condensing purposes is supplied by the pipe X and heated water discharged at Z. No measurements of this water are required since it is used merely to cool the discharge from the calorimeter. The steam from the calorimeter passes through the coil, and when condensed, falls into the receptacle or vessel H. The vessel H is provided with a water glass G and an annexed scale, which is graduated to read, by means of the known volume of a given weight, the weight of water contained in the vessel. In the operation of the instrument then the moisture of a given sample of steam is determined by simply opening the supply valve C and waste cock P until the instrument is heated and in working condition. Then close the valve P and permit the steam to blow through for any convenient length of time. The percent by weight of water contained in the dry steam, will then be the quotient obtained by dividing that in the vessel E as shown by the scale S by the sum of that in the vessel E and in vessel H. No other measurements, nor corrections are required. The condensed steam from coil I enters the vessel H through a pipe T extending toward the bottom of the vessel. Said vessel H might be arranged by itself and provided with a closed bottom but a preferable arrangement is to form the vessel with an open bottom leading into a can J. In using such arrangement cold water is placed into the can J until its surface reaches a point on the zero of the scale G. The discharge steam or condensed steam enters through pipe T and adds to the total bulk of water in can J and vessel H the amount or increase being shown on the scale G. The percentage of moisture is determined as in the previous case by dividing the weight shown on the scale S by the sum of that shown on the scales G and S. The scale G affixed to vessel H is graduated to read weight as for example pounds and tenths of pounds of water by a process of calibration or direct trial. The outlet L and coil I can be connected by any suitable coupling or hose R.

What I claim as new, and desire to secure by Letters Patent, is—

1. The combination with a vessel or receptacle for steam, of an inlet or tube for causing the steam to enter the vessel, said inlet being closed in the direction toward the bottom of the vessel but having openings toward the side of the vessel so as to introduce the moisture and steam into the vessel and to separate the moisture from the steam without agitating the water at the bottom of the vessel, and a discharge orifice or outlet from the vessel for the dry steam, substantially as described.

2. The combination with a vessel or receptacle for steam, of a circuitous or angular inlet of undiminished diameter throughout to allow the steam to enter the vessel without previous change of pressure, said inlet being closed in the direction toward the bottom of the vessel but having openings toward the side of the vessel so as to introduce the moisture and steam into the vessel and to separate the moisture from the steam without agitating the water at the bottom of the vessel, a discharge or outlet from the vessel for the dry steam, and a condenser made to communicate with the discharge or outlet, substantially as described.

3. The combination with a water chamber or receptacle provided with an inlet closed in the direction toward the bottom of the chamber but having openings toward the side of the chamber so as to introduce steam and water into the chamber without agitating the water at the bottom thereof, of a steam chamber or receptacle made to communicate with the water chamber for receiving steam separated directly from the water, said water chamber being provided with a water glass and with a scale or index for noting the precipitated water, substantially as described.

4. The combination with a water chamber or receptacle having an inlet of a steam chamber or receptacle made to surround the water chamber to form a jacket for the latter said steam chamber being made to communicate with the water chamber for receiving steam separated directly from the water, substantially as described.

5. The combination with a water chamber or receptacle having an inlet closed in the direction toward the bottom of the chamber but having openings toward the side of the chamber so as to introduce steam and water into the chamber without agitating the water at the bottom of the chamber, of a steam chamber or receptacle communicating with the water chamber a condenser made to communicate with the steam chamber, and a measure connected to the condenser, substantially as described.

In testimony whereof I have hereunto set my hand in the presence of two subscribing witnesses.

ROLLA CLINTON CARPENTER.

Witnesses:
O. P. HYDE,
JAMES HALLARN.